(12) United States Patent
Givehchi

(10) Patent No.: US 6,826,372 B1
(45) Date of Patent: Nov. 30, 2004

(54) METHODS AND APPARATUS FOR DYNAMIC THRESHOLD SETTING FOR AN OPTICALLY AMPLIFIED RECEIVER

(75) Inventor: Mehrdad Givehchi, Boston, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 627 days.

(21) Appl. No.: 09/650,893

(22) Filed: Aug. 30, 2000

(51) Int. Cl.$^7$ .............................................. H04B 10/06
(52) U.S. Cl. ...................................... 398/209; 398/210
(58) Field of Search ..................... 250/214 A; 375/318; 398/208, 209, 210; 330/9

(56) References Cited

U.S. PATENT DOCUMENTS

| | | | | |
|---|---|---|---|---|
| 5,896,391 A | * | 4/1999 | Solheim et al. .............. | 714/704 |
| 6,064,248 A | * | 5/2000 | Seki ............................ | 327/296 |
| 6,297,701 B1 | * | 10/2001 | Visocchi et al. ............ | 330/308 |
| 6,342,694 B1 | * | 1/2002 | Satoh ...................... | 250/214 A |
| 6,493,404 B1 | * | 12/2002 | Iizuka et al. ................ | 375/343 |

FOREIGN PATENT DOCUMENTS

JP             408018429 A   *   1/1996

* cited by examiner

Primary Examiner—Jason Chan
Assistant Examiner—Shi K. Li
(74) Attorney, Agent, or Firm—Weingarten, Schurgin, Gagnebin & Lebovici LLP

(57) ABSTRACT

An optical receiver circuit includes a differential limiter amplifier receiving a binary electrical waveform generated by an optical-to-electrical converter receiving an optical communications signal. Low-pass filter circuits are coupled to differential outputs of the limiter amplifier to obtain the average DC values of the mirror-image output signals. The outputs of the low-pass filter circuits are provided to a differential amplifier to obtain the difference between these average DC values. The output of the differential amplifier is provided to an integrator circuit whose slowly-varying output is provided to the limiter amplifier to establish a switching threshold for distinguishing logic "0"s from logic "1"s in the received data signal. The switching threshold is automatically adjusted in response to varying operation conditions such as changes in the received optical signal power. Set point adjustment circuitry provides a variable set point input to the integrator circuit to minimize the effects of noise in the received optical signal. The receiver circuit can be used with error-detection circuitry and performance monitoring circuitry to characterize the sensitivity of error performance to the value of the switching threshold. This sensitivity information can be used to adjust transmit signal powers to achieve a desired balance of optical signal to noise ratios among a number of channels in a WDM signal.

2 Claims, 4 Drawing Sheets

METHODS AND APPARATUS FOR DYNAMIC THRESHOLD SETTING FOR AN OPTICALLY AMPLIFIED RECEIVER

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of optical communication, and more particularly to optical communications receivers.

A typical structure for the front end of an optical communications receiver includes an optical-to-electrical (O/E) converter such as a positive-intrinsic-negative (PIN) diode, a transimpedance amplifier for converting the current signal produced by the O/E converter to a corresponding voltage signal, and a multi-stage limiter amplifier that produces a higher-amplitude binary data signal from the voltage signal generated by the transimpedance amplifier. The limiter amplifier distinguishes between logic "0"s and logic "1"s in the received data signal by comparing the data signal with a predetermined switching threshold. If the voltage level of the data signal is greater than the switching threshold, the limiter amplifier produces an output voltage at a first level indicative of a logic "1", and if the voltage level of the data signal is less than the switching threshold, the limiter amplifier produces an output voltage at a second level indicative of a logic "0".

It is important that the switching threshold be established such that the data signal generated by the limiter amplifier resembles the original data signal transmitted to the receiver as closely as possible. In many receiver circuits, the value of the switching threshold is a constant determined by the design of the circuit, and the value is chosen in accordance with known or assumed worst-case operational characteristics it has also been known to employ a calibration procedure in which the power of the received optical signal in an operational system is measured, and a pre-established table is consulted to select a corresponding value for the switching threshold. The first approach may result in an overly conservative receiver design, which can lead to inefficiencies in the optical communication system that might otherwise be avoided. The second approach can achieve a better match between the characteristics of a given optical communications signal and the switching threshold employed by the receiver. However, an explicit calibration procedure cannot be used during normal operation of a communications link, and therefore cannot be relied upon to achieve optimal operation as operating conditions vary. Additionally, because the table is generated in advance, its contents reflect certain assumptions that may or may not be met in any given operational environment. Accuracy and efficient operation may suffer when operational conditions do not reflect these assumptions.

BRIEF SUMMARY OF THE INVENTION

In accordance with the present invention, an optical receiver circuit is disclosed that is capable of quickly and accurately adjusting its switching threshold so as to optimize the reception of data. The receiver circuit is adaptive to different operating conditions, and its operation can also be controlled in a manner providing additional advantages not obtained by the above-described prior approaches.

The disclosed receiver circuit includes a differential limiter amplifier receiving on one differential input a binary data signal generated by an optical-to-electrical converter from a received optical communications signal. Low-pass filter circuits are coupled to respective inverting and non-inverting outputs of the limiter amplifier to obtain their average DC values. The outputs of the low-pass filter circuits are provided to respective inputs of a differential amplifier in order to obtain the difference between these average DC values. The output of the differential amplifier is provided to an integrator circuit whose slowly-varying output is provided to the other differential input of the limiter amplifier to establish a switching threshold for distinguishing logic "0"s from logic "1"s in the received data signal.

By detecting the difference between the average DC values of the differential signals generated by the limiter amplifier, the receiver circuit can establish a switching threshold as a function of the separation between the logic "0" and logic "1" levels of the received data signal. This threshold is automatically adjusted in response to varying operation conditions such as changes in the received optical signal power. This operation is achieved without the need for extensive calibration procedures or other complicated techniques.

The disclosed receiver circuit can also receive a generally variable set point input that provides for external control of the switching threshold. Set point adjustment circuitry can be employed to further optimize the setting of the switching threshold, for example to minimize the effects of noise appearing in the received optical signal. This setting can be a relatively constant value, or it may be adjusted dynamically during normal operation of the receiver.

The disclosed receiver circuit can also be used with error-detection circuitry and performance monitoring circuitry to characterize the sensitivity of the error rate in the recovered data signal to the value of the switching threshold. A quality factor or "Q" factor can be derived from this information, and made available to management software for use in characterizing and/or modifying system behavior. In particular, this information can be used to adjust transmit signal power to improve the optical signal-to-noise ratio (OSNR) of the optical signal. When used in a wavelength-division multiplexed (WDM) system, this mechanism allows for independent adjustment of channel powers to achieve a desired balance among the respective OSNRs of the channels.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
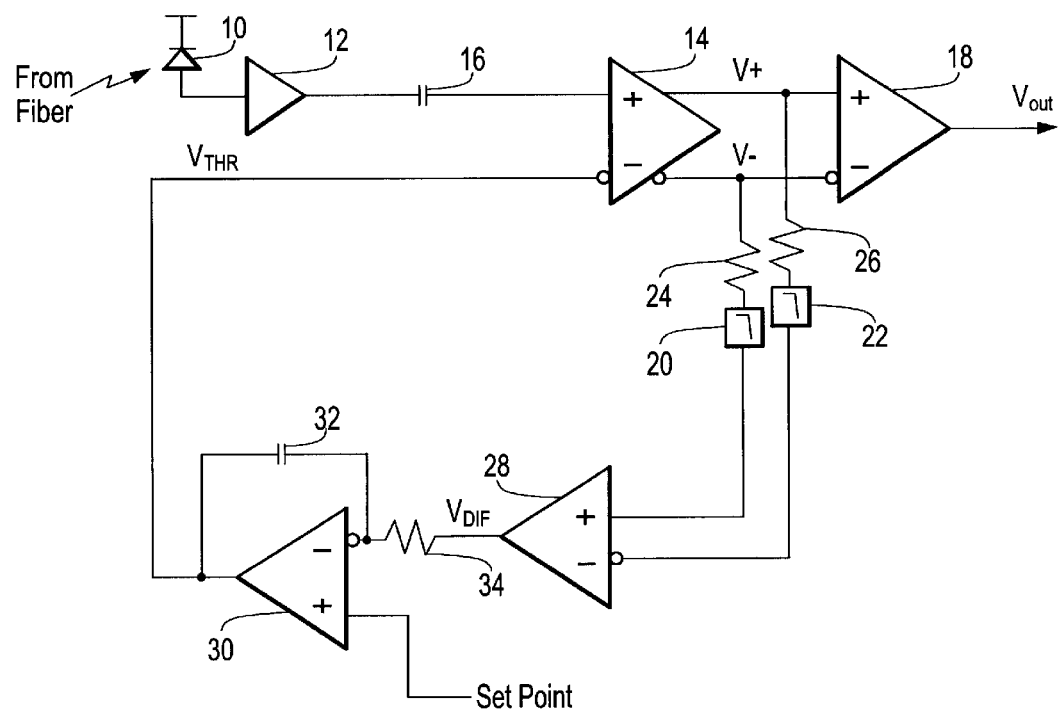
FIG. 1 is a schematic diagram of an optical receiver input amplifier with dynamic threshold adjustment in accordance with the present invention.

In FIG. 1, an optical to electrical (O/E) converter 10, such as a positive-intrinsic-negative (PIN) diode, generates a current corresponding to the intensity of a modulated optical communications signal received from an optical fiber. This current is converted to a voltage waveform by a transimpedance amplifier 12, the output of which is provided to the non-inverting input of a differential limiter amplifier 14 via a DC blocking capacitor 16. The differential outputs of the limiter amplifier 14, labeled $V_+$ and $V_-$, are provided as inputs to a second differential limiter amplifier 18. The output of the amplifier 18 is a binary data signal $V_{out}$ corresponding to the information signal carried by the optical communications channel.

The signals $V_+$ and $V_-$ are provided to respective low-pass filter circuits 20, 22 via corresponding resistors 24, 26, and the outputs of the filter circuits 20, 22 are provided as inputs to a differential amplifier 28. The output of the amplifier 28, labeled $V_{dif}$, is provided to the inverting input of an integrator circuit consisting of a differential amplifier 30, a capacitor 32, and a resistor 34. The non-inverting input of the integrator circuit receives a signal labeled SET POINT, which is generated by other circuitry as described below. The output of the integrator circuit is a threshold voltage $V_{thr}$ provided to the inverting input of the first limiter amplifier 14.

In general, the binary data signal recovered by the circuit of FIG. 1 has a bit rate on the order of $10^6$ bits per second or higher. For example, the optical communication signal on the fiber may be a Synchronous Optical Network (SONET) Optical Carrier-3 (OC-3) or OC-12 signal, which have respective signaling rates of 155 Mb/s and 622 Mb/s. The low-pass filters 20 and 22 are used to obtain the respective DC components of the outputs $V_+$ and $V_-$ from the limiter amplifier 14. The cutoff frequency of each filter 20 and 22 can be on the order of 1 KHz or lower. The filters 20 and 22 can be implemented, for example, as first-order resistor-capacitor (RC) networks. The bandwidth of the integrator circuit can be on the order of 10 KHz.

Figure 2:
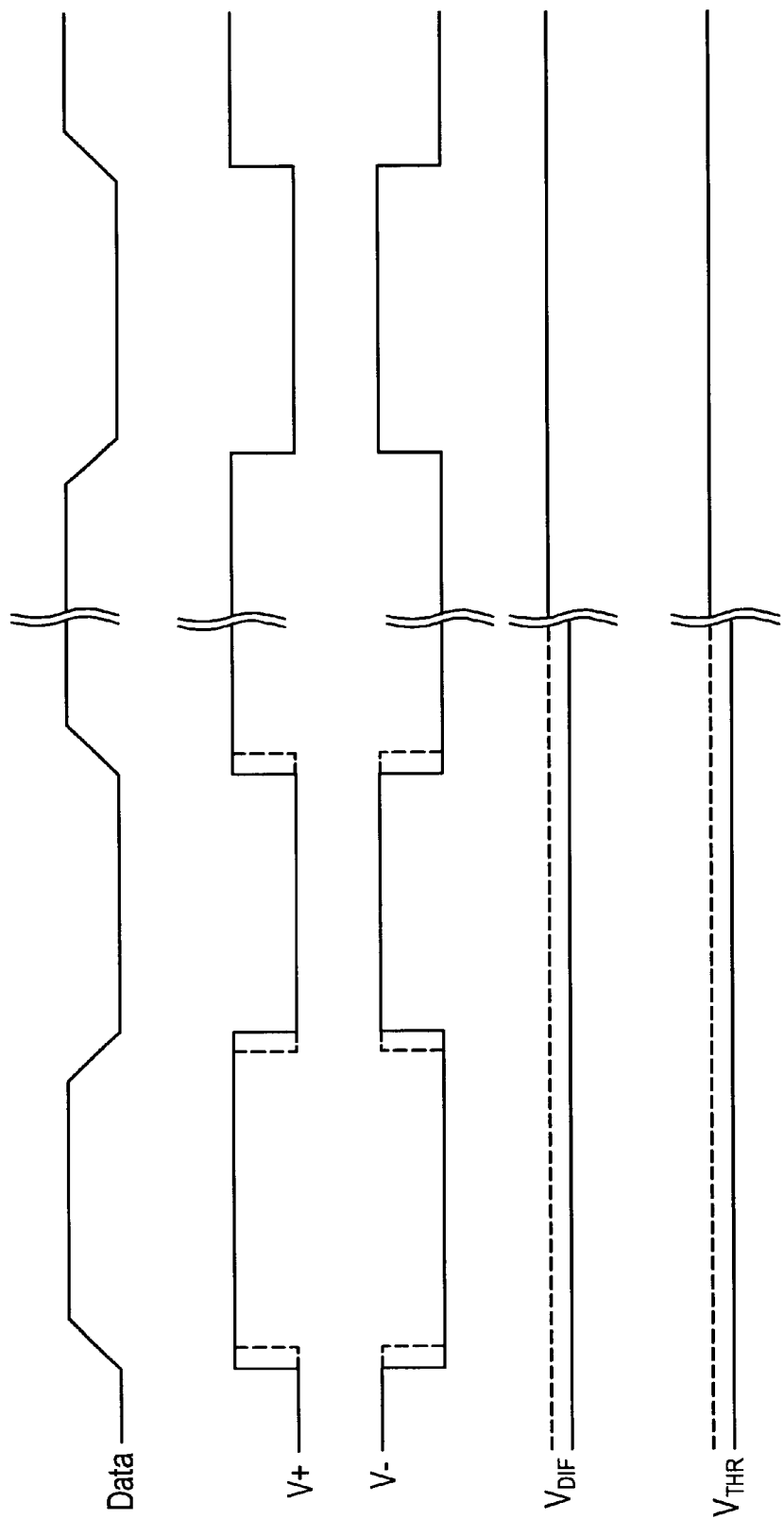
FIGS. 2 and 3 are waveform diagrams illustrating the operation of the input amplifier of FIG. 1.
Figure 3:
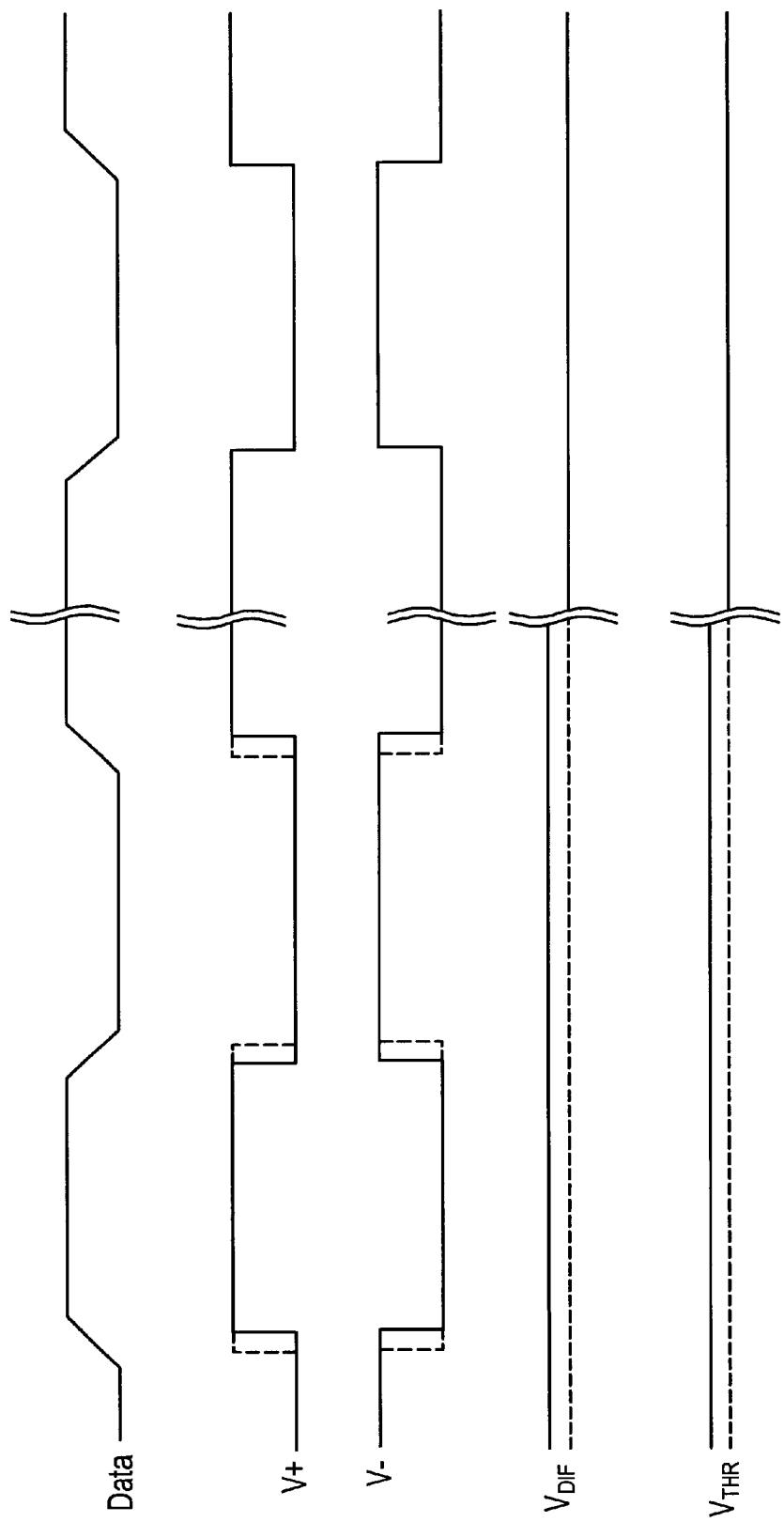

The operation of the circuit of FIG. 1 is described with additional reference to the waveform diagrams of FIGS. 2 and 3. The threshold voltage $V_{thr}$ provided to the inverting input of the limiter amplifier 14 is used to distinguish a logic "1" from a logic "0" in the data stream. FIG. 2 shows the case in which $V_{thr}$ is initially less than an ideal switching threshold indicated by a dotted line. The nature of the ideal switching threshold is described below. As shown in FIG. 2, the signal $V_+$ has a positive pulse width that is slightly wider than the pulse width that would be obtained if $V_{thr}$ were at the ideal level (as indicated by dotted lines in the $V_+$ waveform). Similarly, the signal V has a positive pulse width that is slightly narrower than the pulse width that would be obtained if $V_{thr}$ were at the ideal level. As a result, the average DC value of the signal $V_+$ is greater than the average DC value of the signal $V_-$, and therefore the signal $V_{dif}$ is less than an ideal value indicated by the dotted line. Over time, the integration of $V_{dif}$ causes $V_{thr}$ to increase such that the circuit achieves a state shown in the right half of FIG. 2, in which the transitions of the signals $V_+$ and $V_-$ occur in the precise middle of the transitions of the data signal, and $V_{dif}$ and $V_{thr}$ are at their respective ideal values.

FIG. 3 shows the case in which $V_{thr}$ is initially greater than the ideal switching threshold. The signal $V_+$ has a positive pulse width that is slightly narrower than the pulse width that would be obtained if $V_{thr}$ were at the ideal level (as indicated by dotted lines in the $V_+$ waveform). Similarly, the signal $V_-$ has a positive pulse width that is slightly wider than the pulse width that would be obtained if $V_{thr}$ were at the ideal level. As a result, the average DC value of the signal $V_+$ is less than the average DC value of the signal $V_-$, and therefore the signal $V_{dif}$ is greater than the ideal value indicated by the dotted line. Over time, the integration of $V_{dif}$ causes $V_{thr}$ to decrease such that the circuit achieves a state shown in the right half of FIG. 2, in which the transitions of the signals $V_+$ and $V_-$ occur in the precise middle of the transitions of the data signal, and $V_{dif}$ and $V_{thr}$ are at their respective ideal values.

The ideal values for the various signals in the circuit of FIG. 1 relate to the value of the signal SET POINT. The overall action of the circuit is to establish a switching threshold $V_{thr}$ that causes the value of $V_{dif}$, which represents the difference between the respective average DC values of the signals $V_+$ and $V_-$, to be equal to the value of the signal SET POINT. It will thus be appreciated, for example, that if the signal SET POINT is at zero volts, the threshold voltage $V_{thr}$ will assume a value that causes the signals $V_+$ and $V_-$ to both have 50% duty cycles. Under many conditions, the value of $V_{thr}$ that causes such operation is the voltage precisely midway between the levels representing "0" and "1" respectively in the data signal. This is true when the incoming data itself has a balanced proportion of "0"s to "1"s, i.e., the data stream is DC balanced. The absolute value of this midway voltage can vary due to various factors, including for example the power level of the received optical signal, the effects of optical amplifiers, and other factors. The circuit of FIG. 1 automatically adjusts the value of $V_{thr}$ as necessary to obtain the duty cycle difference commanded by the signal SET POINT.

The signal SET POINT can be set in a variety of ways. If the worst case power and optical signal-to-noise ratio (OSNR) of the received signal are known, SET POINT can be hardwired to a value corresponding to the ideal switching threshold under such conditions. Alternatively, the signal SET POINT may be a variable value set by hardware or software in accordance with an in-field calibration procedure. This approach advantageously enables the re-setting of SET POINT at periodic maintenance intervals or upon re-configuration of the system.

In some systems it may be desirable that the value of the signal SET POINT be dynamically controllable, permitting the characteristics of the receiver circuit to be optimized for different operational conditions. When the receiver circuit is used in a system employing optical amplifiers, for example, the received data signal generally includes a certain type of noise known as "amplified spontaneous emissions" or ASE. ASE noise tends to interfere with the correct detection of logic "1"s more than it interferes with the detection of logic "0"s. Accordingly, in the presence of ASE it may be desirable to reduce the value of the signal $V_{thr}$ below the midway voltage to reduce the number of noisy "1"s that are erroneously interpreted as "0"s.

Figure 4:
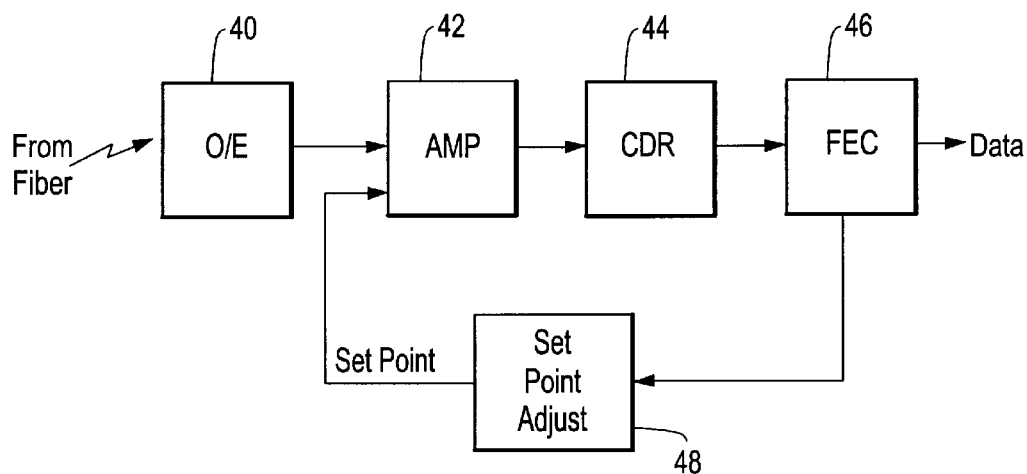
FIG. 4 is a block diagram of an optical receiver employing the input amplifier of FIG. 1.

FIG. 4 shows an optical receiver capable of dynamically adjusting the value of the signal SET POINT such that the occurrence of errors in the received data stream can be minimized. The optical signal from the fiber is supplied to an optical-to-electrical (O/E) converter 40, such as the PIN diode 10 shown in FIG. 1. The output of the O/E converter 40 is supplied to an amplifier 42 of the type shown in FIG.

1. The output of the amplifier 42 is supplied to a clock and data recovery (CDR) circuit 44, the output of which is supplied to a forward error correction (FEC) circuit 46 that detects and corrects errors in the data stream. The FEC circuit 46 provides an indication of the bit error rate to a set point adjustment circuit 48, which in turn provides the signal SET POINT to the amplifier 42 for use in setting its 1/0 switching threshold.

The set point adjustment circuit 48 consists of hardware and/or software that varies the value of the signal SET POINT to achieve desired error performance as reported by the FEC circuit 46. For example, the set point adjustment circuit 48 may vary the signal SET POINT in a manner tending to minimize the overall bit error rate. Alternatively, the set point adjustment circuit 48 may vary the signal SET POINT to balance the number of erroneous "0"s and the number of erroneous "1"s, if the FEC circuit 46 provides such separate bit error information.

Figure 5:
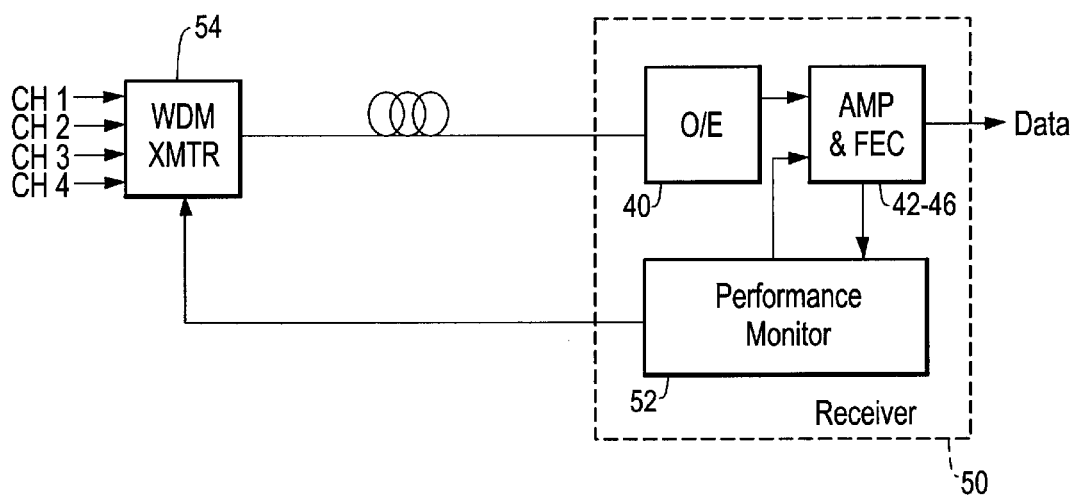
FIG. 5 is a block diagram of an optical communications system employing the optical receiver of FIG. 4 to provide feedback to an optical transmitter for selective adjustment of optical channel transmit power.

A more sophisticated use of the circuit of FIG. 4 is illustrated in FIG. 5. A receiver 50 includes a performance monitor circuit 52 that receives per-channel error information from the FEC circuit 46 and generates the variable signal SET POINT for the amplifier 42. In addition, the performance monitor circuit 52 generates information used by a wavelength division multiplexed (WDM) transmitter 54 to adjust the optical power levels of the separate channel signals that constitute the WDM optical signal received by the receiver 50. The performance monitor circuit 52 operates to achieve a desirable balance of the respective OSNRs for the separate WDM channels, thereby enhancing overall system performance.

In the system of FIG. 5, the performance monitor circuit 52 varies the value of the signal SET POINT to intentionally induce errors into the received data stream, keeping the error rate to within the error-correcting power of the FEC circuit 46. By observing the change in the error rate as a function of the value of SET POINT, the performance monitor circuit 52 can determine how sensitive each channel is to the value of the switching threshold. Excessive sensitivity for a given channel may indicate that the channel has an undesirably low OSNR. Conversely, a low sensitivity may indicate that a channel has a higher OSNR than may be required for adequate performance. The performance monitor circuit 52 can use this sensitivity information to instruct the transmitter 54 to modify the optical power(s) of one or more channels in order to achieve a better balance of OSNR across all channels. In particular, power may be shifted from a channel having low sensitivity to one having higher sensitivity, while the power level of the combined WDM signal is maintained at a relatively constant value. The overall operation of the WDM link is improved by making better use of the available transmit power.

Methods and apparatus for dynamic threshold setting in an optical receiver have been described. It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. An optical communications receiver circuit, comprising:
   a limiter amplifier having differential inputs and differential outputs, one differential input receiving a binary electrical waveform generated by an optical-to-electrical converter receiving an optical communications signal;
   two low-pass filter circuits each having an input and an output, the input of each low-pass filter circuit being coupled to a corresponding differential output of the limiter amplifier;
   a differential amplifier having an output and differential inputs, each input being coupled to the output of a corresponding one of the low-pass filter circuits;
   an integrator circuit having an output and a pair of differential inputs, the output being coupled to the other differential input of the limiter amplifier, one differential input being coupled to the output of the differential amplifier, and the other differential input having a set point signal supplied thereto; and
   set point adjustment circuitry operative to generate the set point signal, the set point signal indicating a desired difference between the respective average DC values of the differential outputs of the limiter amplifier.

2. An optical communications receiver circuit according to claim 1, wherein the set point adjustment circuitry is operative to vary the value of the set point signal in response to information concerning the occurrence of errors in the data stream represented by the signals appearing on the outputs of the limiter amplifier.

* * * * *

UNITED STATES PATENT AND TRADEMARK OFFICE
CERTIFICATE OF CORRECTION

PATENT NO. : 6,826,372 B1
APPLICATION NO. : 09/650893
DATED : November 30, 2004
INVENTOR(S) : Mehrdad Givehchi It is certified that error appears in the above-identified patent and that said Letters Patent is hereby corrected as shown below:

Column 1, line 44, "tics it has" should read --tics. It has--.

Signed and Sealed this

Fifteenth Day of January, 2008

JON W. DUDAS
*Director of the United States Patent and Trademark Office*